350-274 CROSS REFERENCE SEARCH ROOM

OPTICAL PATTERN RECOGNITION DEVICE USING NON-LINEAR PHOTOCELL

Filed Nov. 9, 1964 2 Sheets-Sheet 1

INVENTOR
HEWITT D. CRANE
BY Samuel Lindenberg
ATTORNEY

Fig. 10
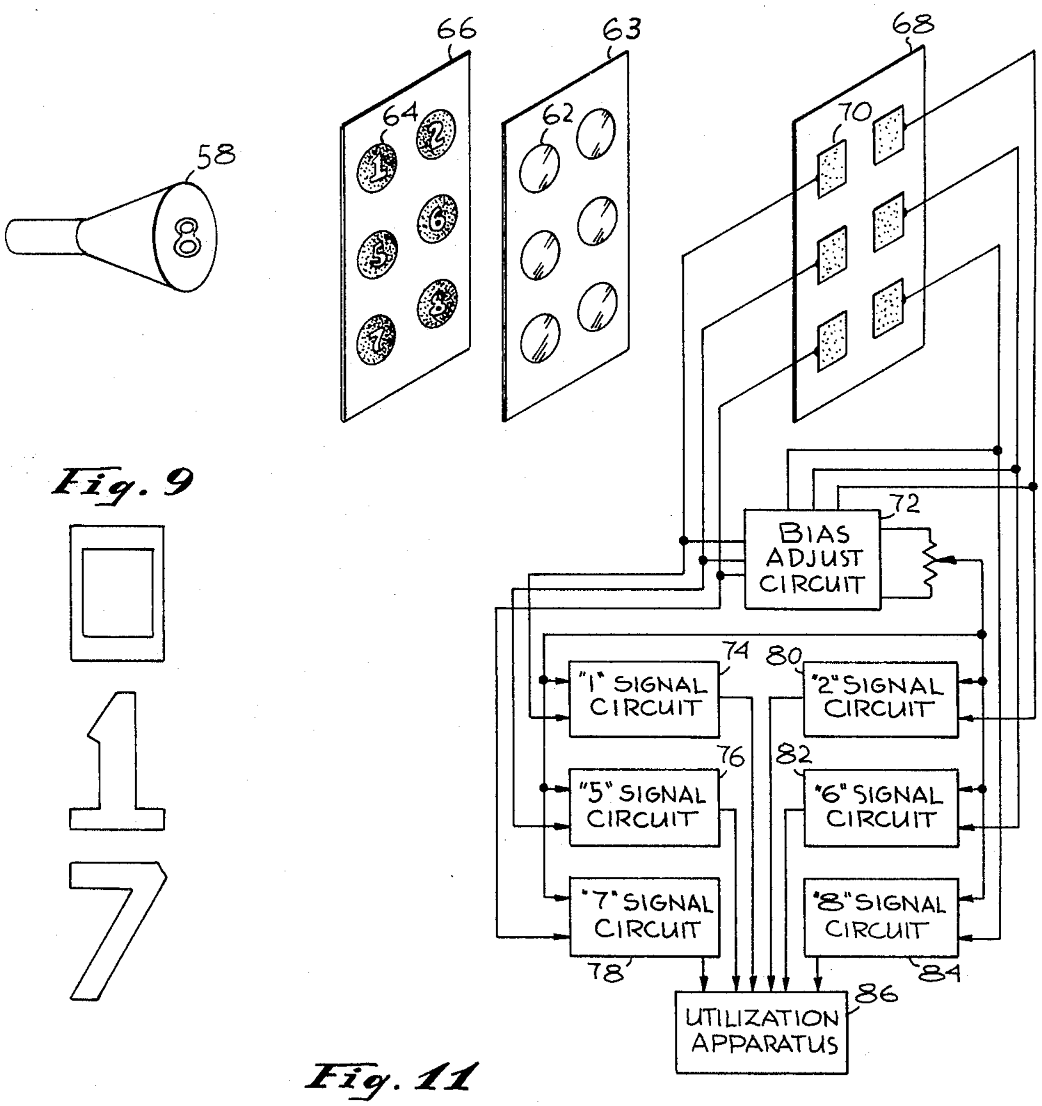
Fig. 9, Fig. 10
Fig. 11
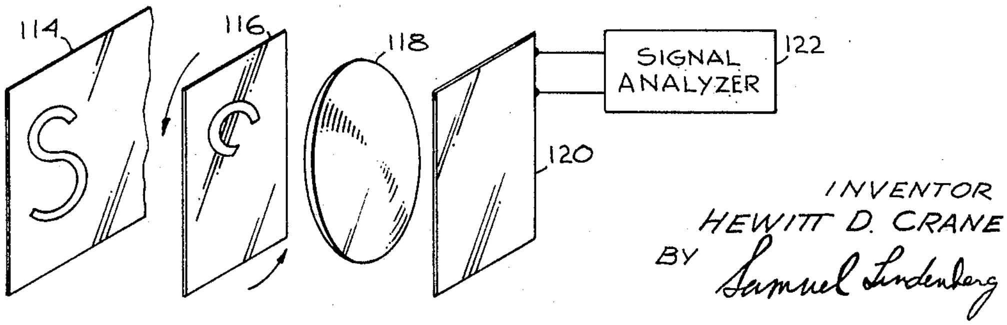
INVENTOR
HEWITT D. CRANE
BY Samuel Lindenberg
ATTORNEY United States Patent Office 3,394,347

Patented July 23, 1968

3,394,347

OPTICAL PATTERN RECOGNITION DEVICE USING NON-LINEAR PHOTOCELL

Hewitt D. Crane, Portola Valley, Calif., assignor to Stanford Research Institute, Menlo Park, Calif., a corporation of California Filed Nov. 9, 1964, Ser. No. 409,655
5 Claims. (Cl. 340—146.3)

ABSTRACT OF THE DISCLOSURE

An optical pattern recognition system is provided which includes a mask, a non-linear photo cell, and a lens interposed therebetween. The pattern to be recognized is projected by means of the lens onto the mask aperture and therethrough to the photo cell. The mask is rotated in order to effectively scan the pattern.

This invention relates to photoelectric apparatus used for pattern recognition and more particularly to improvements therein.

Optical pattern recognition systems were initially developed for the purpose of serving as reading aids for the blind. With the advent of computers, a considerable amount of development has taken place in order to utilize optical pattern recognition devices for the purpose of data entry into these computers. The military has also sought to develop pattern recognition systems to be used for map surveying systems and the like.

One of the problems attendant with some optical pattern recognition systems which are presently being used is that they are position sensitive, that is, the data or pattern being scanned must be properly oriented for proper recognition to occur. Further, the pattern relative to the scanning device must be properly registered.

An object of this invention is to provide a novel pattern recognition system which is not affected by the position of the data or pattern being presented for recognition thereto.

Another object of the present invention is the provision of a pattern recognition system which is unaffected by variations in distance between the pattern sought to be recognized and the scanning system.

Yet another object of the present invention is the provision of a novel, useful and simple optical pattern recognition system.

These and other objects of the present invention may be achieved by utilizing a basic combination of a mask and a nonlinear photocell and a lens interposed therebetween. In one embodiment of the invention, the image is slightly defocused relative to the photocell and the mask is rotated to effectively scan a character or pattern. The photocell will produce a unique signal output for each different pattern being scanned. In a second embodiment of the invention, the characters to be recognized are uniquely marked so that a rotating mask and nonlinear photocell can be used for character recognition. In other embodiments of the invention, the mask has specially shaped apertures. The mask is rotated as a result of which the photocell output is a unique waveshape for each different pattern in a scan.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 9 shows different characters having equal areas;

FIGURE 10 shows an arrangement in accordance with this invention for recognizing characters of the type shown in FIGURE 9; and FIGURE 11 shows a schematic arrangement of another embodiment of the invention.

Figure 1:
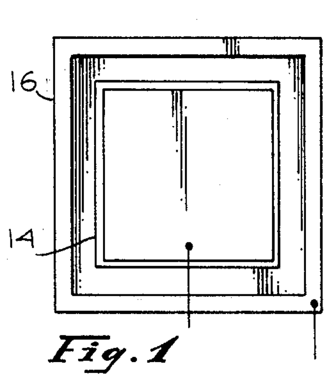
FIGURE 1 and FIGURE 2 are respectively front and side views of a nonlinear photocell which is shown to assist in an understanding of this invention.
Figure 2:
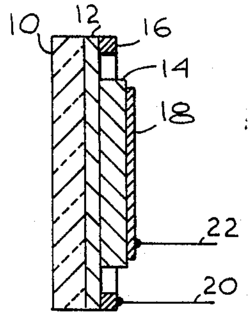

FIGURES 1 and 2 exemplify the construction of a wide area nonlinear photocell. This description is inserted in order to afford a better understanding of the invention. There are other nonlinear photocell constructions which are usable with the invention. Thus, this photocell construction is to be considered as exemplary only. A nonlinear photocell is one wherein the total conductance of the cell G depends on the particular distribution of the light, as well as the total amount of light shining on the cell. Considering now FIGURE 1 and FIGURE 2 of the drawings, they show, by way of example, the construction for a nonlinear photocell. This comprises a glass substrate 10 on one side of which there is coated a transparent conductive layer of material 12. This material may be the well-known Nesa material. A layer of nonlinear photoconductive material 14 such as cadmium sulfide, or cadmium selenide by way of example, is then deposited over a region of the coated glass plate which is less in area than the conductive coating so that a collecting electrode 16 may be placed on the edge of the conductive coating all around the region of the photoconductive material without contacting the photoconductive material. On the back of the photoconductive material, there is deposited a layer of a low resistance metal 18 which serves as a back electrode. Lead wires 20, 22 are respectively connected to the electrodes 16, 18.

Let $g(x,y)$ be the conductivity of the photoconductive layer at the point $(x,y)$ in response to light intensity $I(x,y)$. The total conductance of the cell, measured between the pair of plate electrodes 16, 18 is expressed as $$G=\int_A g(x,y)\ dx\ dy \tag{1}$$

where A is the area of the cell. If $g$ depends linearly on the light intensity (e.g., a photocell model characterized by $g=kI(x,y)$, where $I(x,y)$ is the illumination of point $x,y$ on the photoconductive area and $k$ is constant) then Equation 1 reduces simply to $$G=kL_T \tag{2}$$

where $L_T$ is the total incident light flux. With $g$ a nonlinear function of intensity, however—e.g., the photocell model $$g=kI^p \tag{3}$$

where $p$ is a constant—then G also depends on the particular distribution of light as well.

Figure 4:
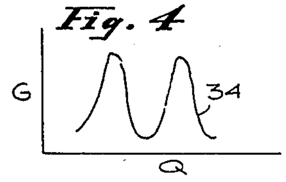
FIGURE 4 and FIGURE 5 are waveshape drawings shown to assist in an understanding of the operation of the invention.
Figure 3:
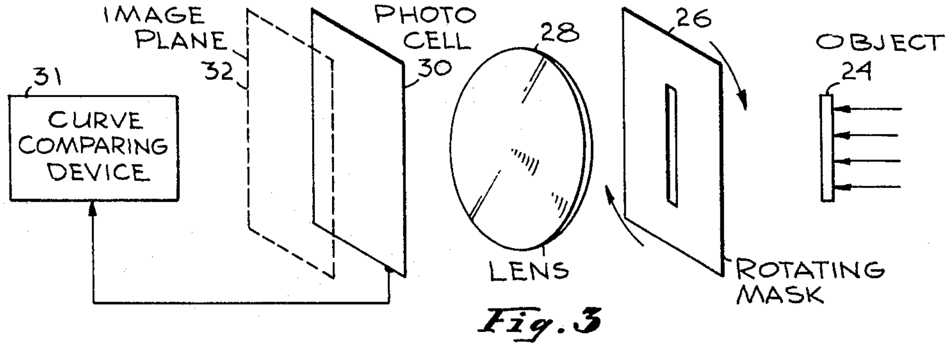
FIGURE 3 is a schematic drawing of the invention.

FIGURE 3 is a schematic drawing illustrating the principles of this invention. There is represented an object 24 which comprises an illuminated line source. This is spaced from a rotating mask 26 which has a line slit therein. Spaced from the mask is a lens 28 and spaced from the lens is a nonlinear photocell 30, which is positioned slightly displaced from the image plane 32 of the lens. The output of the photocell is applied to a utilization device 31. The line image, mask and photocell are all positioned parallel on the optical axis of the lens. The mask 26 is rotated in a plane which is perpendicular to said optic axis. If one observes the light pattern on the photocell 30 as the mask is rotated, it will be noted that this pattern is relatively thin and bright for complete alignment of the mask slit and the illuminated line object and is broader and dimmer when the mask slit is displaced from the aligned orientation by say 90° displacement. In other words, although the total light which reaches the photocell is substantially independent of the relative orientation of the mask and object, the distribution of the light varies significantly with change in the relative orientation of the object and mask. If $\theta$ measures the angle $x$ of rotation of the mask, then, for a photocell with $p$ greater than 1, it will be found that the curve of conductances G versus $\theta$ peaks at a value of $\theta$ equal to the angle of orientation of the mask with the line source. A typical waveform of G versus $\theta$ is sketched in FIGURE 4. The peaks of the curve 34 are 180° apart, since the line mask aligns twice per rotation. The result obtained is independent of the position of the object line, i.e., translation of the line in its own plane, as long as the line image falls on the photocell and the conductance properties of the photocell are uniform across its face.

If the object being scanned by the same line mask is more complex than a single line, a correspondingly more complex $G(\theta)$ curve results. The conductance of the nonlinear photocell becomes relatively large whenever the mask becomes aligned with any line segment in the source. When rotating the line mask in front of a letter "E," for example, it should be expected that the $G(\theta)$ curve has two relatively large peaks for each 180° of rotation, with the relative size of the peaks depending on the ratio of total vertical line segment to total horizontal segment.

Figure 5:
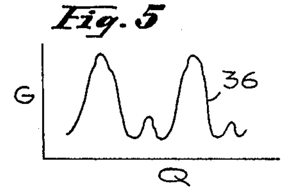

FIGURE 5 shows a waveform 36 which is a typical $G(\theta)$ derived from the nonlinear photocell when the letter "E" is scanned by the rotating line mask. Again, the result is substantially independent of the translational position of the object. Change in angular orientation of the object in its own plane results simply in a shift of the $G(\theta)$ curve of FIGURE 5 along the $\theta$ axis. Thus, the curve comparing device can be any arrangement for comparing the incoming waveform with stored waveforms, which only require overall amplitude compensation. Recognition occurs when the incoming and compared waveforms are the same.

Figure 6:
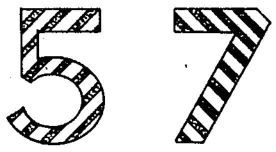
FIGURE 6 shows character marking in accordance with this invention to permit character recognition.

By scanning characters consisting of different combinations of line segments, with a slit mask, recognition of particular characters can be based on the position and magnitude of the various peaks in the $G(\theta)$ curve. An alternative type of arrangement using the same idea is to compose each character with lines having only a single direction, but with the direction being different for each character. By way of example, in FIGURE 6 there are shown two numbers, each of which is illuminated with stripes in a single direction, but the directions differ with each number. For a capacity of ten characters, for example, the angular displacement from character to character is arranged to be 180÷10, or 18°.

Figure 7:
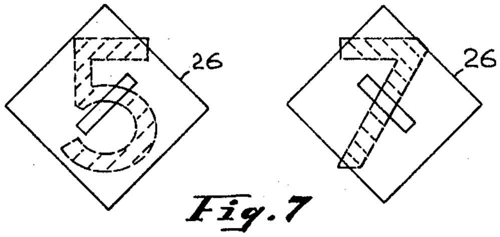
FIGURE 7 shows mask positions relative to the characters of FIGURE 6.
Figure 8:
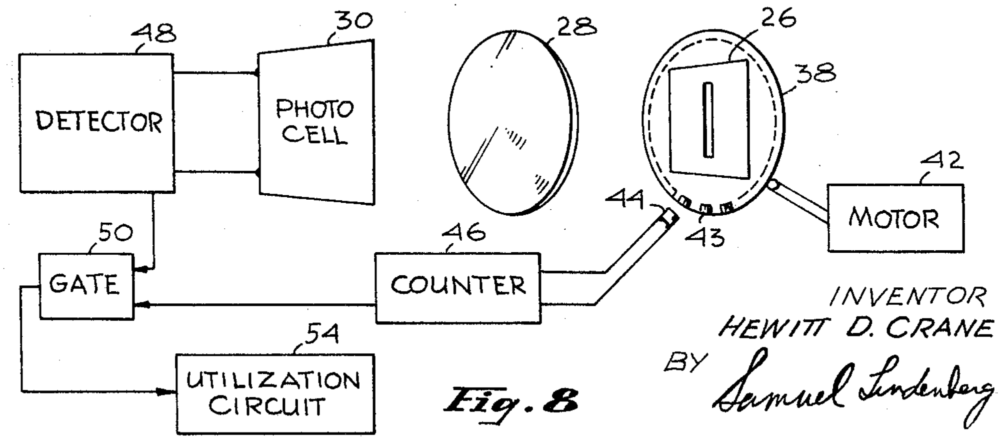
FIGURE 8 shows apparatus in accordance with this invention for recognizing characters shown in FIGURE 6.

FIGURE 7 shows two positions of the line mask 26 respectively over the numbers 5 and 7. It will be seen that for each character, there is a single mask position at which the slit is aligned with the illuminated strips on the number, thus providing an individual and uniquely positioned peak in the $G(\theta)$ curve. The peak therefore occurs at a mask orientation determined by the angle of the lines in the character. Then with a mask rotating at a uniform velocity, for example, letter identification would amount to identifying in which of 10 possible time slots the peak in the signal occurs. Thus, referring to FIGURE 8, if the mask 26 is mounted in a wheel 38, the wheel can be uniformly rotated by a motor 42 which drives the wheel through a suitably coupled drive shaft. The angle made by the wheel and thus the mask may be sensed by any number of mechanisms which are known to the art, such as, for example, by suitably magnetizing or placing magnets 43 around the rim of the wheel and using a magnetic reading head 44 to generate pulses therefrom as the magnets are rotated past it. The output of the magnetic reading head 44 is applied to a cyclic counter 46 which indicates by its count and angle $\theta$ made by the mask at the time that a peak output is produced by the photocell 30.

The output of the photocell 30 is applied to a detector 48 which detects the occurrence of the peak in the photocell output. The detector output is applied to a gate 50 to enable the gate to pass the output of the counter 46 at that time. The counter presents number representative signals at its output which are correlated to the angular positions of the rotating mask.

The gate 50 applies its output to a utilization circuit 54. The utilization circuit 54 may be the data input circuit for a computer.

Assume now an arrangement wherein there is a set of objects with a corresponding set of masks, a lens for each mask and a nonlinear photocell associated with each mask. The photocells are placed relative to the lenses so that they are in the focal plane. Assume now, for ease of explanation, that the total light emitted by each object is the same, as for example in FIGURE 9, where there may be seen the numerals 0, 1, 7, each of which is constructed to have the same total area. If the total light received from each mask is not the same, then one can compensate or equalize the light received by using compensating neutral density filters.

In FIGURE 10 one of these numerals (8), by way of example, is shown illuminated on the face of a cathode ray tube 58 and it is desired to recognize this numeral. A lens holding device 63 holds a set of lenses 62, one for each one of the characters to be recognized. The light from the numeral 8 passes through all of the lens masks 64 and corresponding lenses 62. These masks 64 each has an aperture therein corresponding to a different one of the characters to be recognized, but the apertures are formed therein in a manner so that the total light which passes therethrough is the same regardless of the character. In other words, each of the apertures in the mask is formed so that the total area of the apertures is the same for all the masks. These masks are rotatably held in a mask frame 66.

A frame 68 holds a set of nonlinear photocells 70, one for each of the lenses, with each photocell in the focal plane of its corresponding lens. If the object is noncoherently illuminated, then it is readily shown that the light distribution in the focal plane of each lens corresponds with the complete two-dimensional cross-correlation function of the object pattern and mask pattern. In that case, where the object and mask are identical, the result is a two-dimensional autocorrelation function with a corresponding bright central spot of light. Thus, the conductance of each photocell gives a measure of the two-dimensional cross-correlation function for the particular object mask combination, composed of equal total light, but lesser peaks. If, for any given object pattern, the set of conductance measures is such that the autocorrelation case can be uniquely identified, then there is the basis for a pattern detection scheme that is insensitive to a considerable translation of object position.

This is what is provided in the arrangement shown in FIGURE 10. Since the total light transmitted by each one of the respective masks 64 to each one of the respective photocells 70 is the same regardless of the character which is being viewed, the light pattern distribution which provides an optimum peak in the output signal from the photocells is the one which occurs when the mask having the same shaped aperture as the object being scanned is aligned with that object. The motion or translation of the object will not effect the result. The output from the mask which has the shape of the object will always exceed the outputs of the other photocells.

Thus, referring back to FIGURE 10, each one of the photocells 70 is connected to a bias adjust circuit 72 and to a respective signal character generating circuit 74, 76, 78, 80, 82 and 84. Each one of these signal generating circuits when energized provides an output representative of the character on the associated mask. The bias adjust circuit 72 sets up a bias level determined by the largest output signal from the nonlinear photocells. Only one of the character signal circuits which has applied thereto the highest signal from its associated photocell is enabled to produce an output to the utilization apparatus, indicative of the character which has been recognized.

If the cathode ray tube 58, or an illuminated character bearing document has a constant vertical alignment, it is not necessary to rotate the masks 64. If, however, the character bearing document is presented to the scanning lenses at a random angle, then it is necessary to rotate the masks 64. Because of this, it is necessary to prevent any output from the signal circuits during a first revolution of the masks. The highest amplitude output of the bias adjust circuit is stored and it is only during the second cycle of rotation of the masks, when the bias again attains the highest amplitude level seen during the first cycle that the one of the signal circuits receiving that highest amplitude level output from one of the photocells is permitted to apply its output to the utilization apparatus 86. This can easily be accomplished by sensing the second revolution, or every second revolution of the masks from the drive apparatus for rotating the masks. This can be used to close two switches or gates, one of which enables the signal circuit outputs to be applied to the utilization apparatus during the second revolution and the other of which enables the output of a capacitor which is charged from the bias adjust circuit during the first revolution to be applied to the signal circuits during the second revolution in place of the direct application of the output of the bias adjust circuit.

Irrespective of the exact position of the photocell, either at the focal plane of the lens or at a slightly defocused image plane, rotation of the lens aperture constitutes a scanning process just as does the more conventional optical or magnetic slit scan in which an object traverses under a suitable reading head. With the latter translational type of scan, the signal at any instant depends upon the total area of the character appearing through the relatively narrow slit. Thus, the signal is sensitive to the angular skew of the letter with respect to the slit. With a rotational type of scan, as discussed in FIGURE 3, skew results only in a time shift, but not in a change in the waveshape of the signal. With a rotational type of scan, each rotation affords a complete scan of the character. Thus, the character can be reread with the same head for as long as the character remains in the field of view. To cope with serious skew problems, one can read the character a number of times, each time varying the instant at which matched filter signal are sampled. By matched filter signals is meant the signals obtained from a plurality of filters, each of which is matched to a different signal waveform. The photocell output is applied to all of the filters simultaneously. This is equivalent to introducing a different magnitude of compensating skew on each scan. The largest correlation function from the series of scans can then be chosen.

In principle, an arbitrary shape of scanning aperture can be used in each type of scan. In the case of the translation scan, however, any mask shape other than linear would put a series limitation on vertical registration. (With a linear slit, the translation scan scheme is, of course, independent of vertical translation.) With the translational independence of the rotation scan, however, any aperture shape can be used equally well without registration restriction.

Assume now an arrangement such as is shown in FIGURE 11 wherein the illuminated character S which is on a document 114 is scanned by an arrangement employing a rotating mask 116, the light through which is focused by a lens 118 upon a nonlinear photocell 120, which is positioned at the focal plane of the lens 118. The output of the photocell 120 is applied to a waveform analyzer 122. The character S effectively consists of two half arcs of a circle. The ask 116 has a slit which is an identical half arc. As a result of the rotation of the mask, the output of the photocell will be a waveform with two optimum values or peaks occurring once per revolution when the mask is exactly aligned first with one arc of the "S" and then 180° later when the arc is aligned with the second arc of the "S." If the character 3 were scanned by the curved arc pattern mask, then only one peak per revolution would be obtained, since the arc mask will simultaneously align with both arcs of the object, leading to two simultaneous bright spots in the focal plane.

Because of the translation independence offered by the use of a wide area photocell, it is possible to arrange for a scanning operation to occur simultaneously with several different masks. This is shown in FIGURE 10. Instead of using a peak amplitude, one can use the time conductance waveshape. Each of the resulting scanning signals can then be used for independently forming correlation with corresponding sets of stored signals, with a multiple vote subsequently taken. Or one can view the multiple scanning as a search for object features as lines, arcs, and so on. Relevant information is abstracted in this way by comparing the relative timing and strength of the various peaks in the conductance curves. For example, if a single line stroke is added to the "S" and the "3" patterns to form the patterns "IS" and "13" respectively, then the two new patterns can be distinguished from the original "S" and "3" patterns by noting a strong peak from a line scan signal. The two patterns can be distinguished from each other by again noting the single versus the double peak from the arc scan. However, because of the translation independence provided by the nonlinear photocell, the "IS" and "13" patterns could not, on the basis of a simple line and arc scan, be distinguished from the patterns "SI" and "31."

There has accordingly been described and shown hereinabove a novel, useful and unique character or pattern recognition system wherein the apparatus is not affected by substantial motional translation or skew of the character for which recognition is sought.

What is claimed is:

1. Apparatus for recognizing a pattern from light derived from said pattern comprising a photocell having nonlinear conductance characteristics, said photocell being positioned for receiving light from said pattern, a mask and a lens interposed between said pattern and said photocell for restricting the light falling on said photocell to the light which passes through an opening in said mask, said mask opening being linear, said lens being positioned relative to said photocell with its image plane spaced from the position of said photocell, and means for rotating said mask relative to said pattern about an axis perpendicular to said mask and passing through said linear opening whereby the output of said photocell is a signal having a waveshape characteristic identifiable with said pattern.

2. Apparatus for generating signals uniquely representing a character wherein each character sought to be so uniquely identified has a line pattern the angularity of which is unique for each character, said apparatus comprising a rotatable mask having a linear opening therein, said mask being positioned for scanning a character, a photocell having nonlinear conductance characteristics, a lens positioned between said mask and said photocell for directing the light which passes through said mask and onto said photocell, said photocell being positioned on the optical axis of said lens and spaced from the focal plane of said lens, means for rotating said mask, means for indicating the angle said linear slit of said mask makes with a reference position, as said mask is rotated, means for detecting when said photocell output is a maximum, and means for indicating the character being scanned from the detected maximum output signal of said photocell together with the signal indicative of the angle made by said mask with respect to said reference.

3. Apparatus for generating signals uniquely identifying each character in a plurality of characters wherein said plurality of characters are formed to have substantially identical areas comprising a nonlinear conductance photocell for each one of said characters to be recognized, a plurality of lenses, one for each of said nonlinear conductance photocell, said lenses being interposed between a character and said photocells for directing the light from said character onto each one of the photocells, and a plurality of masks each of which has a different aperture therethrough, the aperture in each of said masks corresponding to a different one of said characters to be recognized, the apertures of each of said masks having the same area as the others of said masks, means positioning said masks for restricting the light received by the respective photocells to the light passing through the respective masks, and means for rotating said masks whereby the one of said photocells which receives its light through a mask having an aperture with the same shape as the aperture of the character being scanned produces an output indicative of that character.

4. Apparatus as recited in claim 3 wherein said photocells are positioned adjacent the focal plane of said lenses.

5. Apparatus for generating signals representative of one of a plurality of characters comprising a plurality of rotatable masks, each of which has an aperture therethrough having the shape of a portion of one of said characters, a plurality of nonlinear conductance photocells, one for each of said plurality of masks, a plurality of lenses interposed between said masks and photocells for focusing light passing through the aperture of a mask upon a corresponding photocell, means for simultaneously and separately rotating each of said masks, and means responsive to the outputs of said photocells for indicating the character being scanned by said mask.

References Cited

UNITED STATES PATENTS

| | | | |
|---|---|---|---|
| 2,894,247 | 7/1959 | Relis | 340—149 |
| 2,933,246 | 4/1960 | Rabinow | 235—61.11 |
| 3,167,744 | 1/1965 | Rabinow | 340—146.3 |
| 3,179,922 | 4/1965 | Rabinow | 340—146.3 |
| 3,013,158 | 12/1961 | McLellan | 250—211 |
| 3,033,078 | 5/1962 | Shuttleworth | 88—14 |
| 3,157,855 | 11/1964 | Rabinow | 340—146.3 |
| 3,210,729 | 10/1965 | Lozier et al. | 340—146.3 |

FOREIGN PATENTS

| | | |
|---|---|---|
| 1,319,644 | 1/1963 | France. |

MAYNARD R. WILBUR, *Primary Examiner.*

J. SHERIDAN, *Assistant Examiner.*